US011302304B2

(12) United States Patent
Albl (10) Patent No.: US 11,302,304 B2
(45) Date of Patent: Apr. 12, 2022

(54) METHOD FOR OPERATING A SOUND OUTPUT DEVICE OF A MOTOR VEHICLE USING A VOICE-ANALYSIS AND CONTROL DEVICE

(71) Applicant: AUDI AG, Ingolstadt (DE)

(72) Inventor: Sebastian Albl, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 16/978,452

(22) PCT Filed: May 28, 2019

(86) PCT No.: PCT/EP2019/063822
§ 371 (c)(1),
(2) Date: Sep. 4, 2020

(87) PCT Pub. No.: WO2019/233827
PCT Pub. Date: Dec. 12, 2019

(65) Prior Publication Data
US 2021/0082395 A1 Mar. 18, 2021

(30) Foreign Application Priority Data
Jun. 4, 2018 (DE) .................... 10 2018 208 707.5

(51) Int. Cl.
*G10L 13/08* (2013.01)
*H05B 47/12* (2020.01)
(Continued)

(52) U.S. Cl.
CPC ................ *G10L 13/08* (2013.01); *B60Q 1/50* (2013.01); *B60Q 5/00* (2013.01); *G06N 3/08* (2013.01);
(Continued)

(58) Field of Classification Search
CPC ......... G10L 13/08; G10L 15/22; G10L 17/22; G10L 25/60; G10L 25/78; H05B 47/12;
(Continued)

(56) References Cited

U.S. PATENT DOCUMENTS 9,429,947 B1 8/2016 Wengreen et al.
10,255,913 B2 4/2019 Zhao et al.
(Continued)

FOREIGN PATENT DOCUMENTS

CN 107465986 A 12/2017
DE 102010048470 A1 8/2011
(Continued)

OTHER PUBLICATIONS

International Search Report and Written Opinion of the International Searching Authority directed to related International Patent Application No. PCT/EP2019/063822, dated Sep. 6, 2019, with attached English-language translation; 26 pages.
(Continued)

*Primary Examiner* — Yogeshkumar Patel
(74) *Attorney, Agent, or Firm* — Sterne, Kessler, Goldstein & Fox P.L.L.C.

(57) ABSTRACT

The invention relates to a method for operating a sound output device of a motor vehicle. A voice-analysis and control device receives a voice signal from a voice detection device of the motor vehicle, wherein the received voice signal describes a voice message from a person who is in exterior surroundings of the motor vehicle. The voice signal is used to ascertain a voice message content of the voice message and a thematic context of the voice message. On the basis of that, a voice output signal is provided that describes a context-related response text for the captured voice message, and the provided voice output signal is transmitted to
(Continued)

the sound output device to output the provided voice output signal to the exterior surroundings of the motor vehicle.

11 Claims, 2 Drawing Sheets

(51) Int. Cl.
| | | |
|---|---|---|
| *B60Q 1/50* | (2006.01) | |
| *B60Q 5/00* | (2006.01) | |
| *G06N 3/08* | (2006.01) | |
| *G10L 17/22* | (2013.01) | |
| *G10L 25/60* | (2013.01) | |
| *G10L 25/78* | (2013.01) | |
| *H04R 1/02* | (2006.01) | |
| *H04R 3/00* | (2006.01) | |
| *B60R 11/02* | (2006.01) | |
| *B60R 11/00* | (2006.01) | |
| *G01C 21/36* | (2006.01) | |

(52) U.S. Cl.
CPC ............. *G10L 17/22* (2013.01); *G10L 25/60* (2013.01); *G10L 25/78* (2013.01); *H04R 1/025* (2013.01); *H04R 3/00* (2013.01); *H05B 47/12* (2020.01); *B60Q 5/008* (2013.01); *B60R 11/0217* (2013.01); *B60R 11/0247* (2013.01); *B60R 2011/004* (2013.01); *G01C 21/3608* (2013.01); *G01C 21/3629* (2013.01); *H04R 2499/13* (2013.01)

(58) Field of Classification Search
CPC . B60Q 1/50; B60Q 5/00; B60Q 5/008; G06N 3/08; H04R 1/025; H04R 3/00; H04R 1/406; H04R 2499/13; B60R 11/0217; B60R 11/0247; B60R 2011/004; G01C 21/3608; G01C 21/3629; Y02B 20/40
See application file for complete search history.

(56) References Cited

U.S. PATENT DOCUMENTS

| | | | |
|---|---|---|---|
| 10,448,150 B2 | 10/2019 | Ekkizogloy et al. | |
| 2001/0043142 A1* | 11/2001 | Milliken | B60Q 1/22 340/463 |
| 2008/0048908 A1 | 2/2008 | Sato | |
| 2011/0090093 A1 | 4/2011 | Grimm et al. | |
| 2014/0136187 A1* | 5/2014 | Wolverton | G10L 15/22 704/9 |
| 2016/0012822 A1 | 1/2016 | Huang et al. | |
| 2017/0021768 A1* | 1/2017 | Jaegal | H04R 1/323 |
| 2017/0030133 A1* | 2/2017 | Elie | B60R 16/03 |
| 2017/0249940 A1* | 8/2017 | Chen | G10L 15/30 |
| 2018/0061415 A1 | 3/2018 | Penilla et al. | |
| 2018/0201273 A1* | 7/2018 | Xiao | B60W 40/09 |

FOREIGN PATENT DOCUMENTS

| | | | |
|---|---|---|---|
| DE | 102017102392 A1 | 8/2017 | |
| DE | 112015006350 T5 | 11/2017 | |
| EP | 1987986 A2 | 11/2008 | |
| WO | WO 2016/149915 A1 | 9/2016 | |
| WO | WO-2016149915 A1 * | 9/2016 | ............ G10L 15/22 |
| WO | WO 2017/078926 A1 | 5/2017 | |

OTHER PUBLICATIONS

Chen, Yun-Nung et al., "Deep Learning for Dialogue Systems," Proceedings of ACL 2017, Tutorial Abstracts, Stroudsburg, PA, USA, Jan. 1, 2017, pp. 8-14.

International Preliminary Report on Patentability directed to related International Patent Application No. PCT/EP2019/063822, completed Jun. 24, 2020, with attached English-language translation; 14 pages.

\* cited by examiner

METHOD FOR OPERATING A SOUND OUTPUT DEVICE OF A MOTOR VEHICLE USING A VOICE-ANALYSIS AND CONTROL DEVICE

TECHNICAL FIELD

The present disclosure relates to a method for operating a sound output device of a motor vehicle by means of a voice-analysis and control device. A sound output device is understood to be a device or a device component for outputting an audio signal, which can have, for example, a loudspeaker, preferably a plurality of loudspeakers. The sound output device is designed and arranged on the motor vehicle in such a way that an output signal can be output to the exterior surroundings of the motor vehicle. The audio signal is, for example, a voice output signal; i.e. a signal that describes a spoken text.

BACKGROUND

Sound output devices, for example external sound loudspeaker systems (such as acoustic vehicle alerting systems, "AVAS") are installed in motor vehicles to warn pedestrians when driving an electrical vehicle. For example, an engine sound can be output to a pedestrian so that the pedestrian hears the motor vehicle. The pedestrian is thus warned of the motor vehicle.

The communication of the motor vehicle with the driver or a passenger takes place via loudspeakers in the interior. The passenger or the driver of the motor vehicle can "communicate" with the vehicle via the interior loudspeakers and operate an infotainment system, for example, by voice input. In the case of a piloted motor vehicle, however, this possibility does not arise when the person is no longer in the interior or, for example, does not have a key for the motor vehicle.

EP 1987 986 A2 describes a communication system for a motor vehicle to communicate an audio sound inside and outside the motor vehicle. As a result, an occupant of the motor vehicle can communicate with a person outside the motor vehicle without having to wind down the window.

In US 2017/0021768 A1, a motor vehicle control unit has a camera which is designed to photograph an image around the motor vehicle; a screen unit which is designed to display the image obtained from the camera; at least one sound sensor, which is also arranged in the motor vehicle and is designed to sense a sound that was generated inside or outside the motor vehicle; at least one sound output unit which is arranged on the motor vehicle and is designed to output a sound outside or inside the motor vehicle; and a control unit that is designed to sense a situation in the motor vehicle, wherein the situation is based on the sound generated inside or outside the motor vehicle, and for controlling at least one of the sound sensors, the sound output unit, and the screen unit, in order to output information based on the sensed situation of the motor vehicle.

DE 10 2010 048 470 A1 describes a vehicle-pedestrian communication system which comprises a vehicle-based device which has a transmitter and a receiver for transmitting the global positioning of the vehicle.

If the pedestrian is warned by an alarm signal that is merely an engine sound or, for example, a warning tone, the pedestrian can effectively be made aware of a danger. The detailed circumstances or background of the warning signal can only be captured by the pedestrian when he has an overview of the entire situation.

DETAILED DESCRIPTION

One object of the present disclosure is to increase efficiency of the "communication" between the motor vehicle and a person who is in the exterior surroundings of the motor vehicle.

The present disclosure is based on the idea of providing a voice-analysis and control device which uses a voice input from a person who is in the exterior surroundings of the motor vehicle to ascertain a voice message content of the captured voice message and a thematic context of the captured voice message. On the basis of that, a voice output signal is provided that describes a context-related response text for the captured voice message. This signal is output by the sound output device to the exterior surroundings of the motor vehicle.

This advantageously improves a warning for pedestrians or cyclists. By means of the method and the devices according to the present disclosure, the motor vehicle can provide personalized voice output, and thus communicate with the person outside the motor vehicle in a situation-specific and/or user-specific manner and accordingly conduct a dialogue. This allows, for example, more intensive communication between a vehicle owner, his family environment, and the motor vehicle. In other words, the motor vehicle interacts with the person. The person can build a personal bond with the motor vehicle and consider it as a personal contact.

The possibility of communication and/or confirmation on the part of the motor vehicle can be made possible even before entering the motor vehicle. For the motor vehicle manufacturer, it results in the generation of new business areas with a high sales potential. For example, parked motor vehicles can personally address any passers-by in a user group and, for example, respond to questions or, for example, advertise products. For this purpose, it can also be made possible, for example, that an owner of the vehicle can agree to such advertising measures and can receive a service in return, for example a fuel voucher. In other words, communication tailored to the person takes place between the motor vehicle and this person.

In other words, the motor vehicle can also be used as a personalized information option, and the motor vehicle thereby becomes "more human." An anxious person, for example a person who is anxious when driving or in the vicinity of the motor vehicle, can thereby be given more confidence in the motor vehicle. This aspect is of great support for the person, particularly in the case of piloted motor vehicles. By calming the person down, traffic safety is ultimately increased.

The method according to the disclosure for operating a sound output device of a motor vehicle has the following steps carried out by a voice-analysis and control device. The sound output device can be designed, for example, as a loudspeaker system having a plurality of external loudspeakers. A voice-analysis and control device is understood to mean a device or a device component, or a system of a plurality of device components, which is designed for voice analysis, as well as for receiving signals, evaluating them, and for generating signals, preferably audio signals. The voice-analysis and control device can be designed, for example, as a control unit having voice analysis software. The voice-analysis and control device can be, for example, a component of the motor vehicle and/or a component of a motor vehicle-external server device.

According to the disclosure, the reception of a voice signal from a voice detection device takes place first, in which the received voice signal describes a voice message of a person who is in the exterior surroundings of the motor vehicle, said voice message being captured by the voice detection device. A voice detection device is understood to be a device or a device component, or a device network, which is designed and configured for detecting and/or recognizing voice, and can preferably be a voice detection device of the motor vehicle. The voice detection device can preferably be designed as a sound transducer, for example as a directional microphone. The exemplary directional microphone can preferably be arranged on an outside of the motor vehicle. Alternatively or additionally, the voice detection device can comprise a camera that can film the exterior surroundings of the motor vehicle and that can, for example, detect and recognize a control unit with software for recognizing voice on the basis of filmed lip movements.

The received voice signal is used to ascertain a voice message content of the captured voice message and a thematic context of the captured voice message. This can be done, for example, by means of a voice analysis, and/or voice recognition, and/or recognition of voice patterns. The voice message can be, for example, a greeting from the person or a question about a specific location. A corresponding thematic context can then be, for example, a welcome dialogue, or the context of navigation to the place of destination can be a route description.

Depending on the ascertained thematic context and the ascertained voice message content, a provision of a voice output signal takes place which describes a context-related response text for the captured voice message. The response text can be, for example, a response to the exemplary greeting or, for example, the information that the motor vehicle is now opening the doors, or, for example, a route description to the place of destination selected by the person.

The voice output signal provided is then transmitted to the sound output device to output the voice output signal provided to the exterior surroundings of the motor vehicle. The sound output device can then preferably output the transmitted voice output signal and respond to the person in a context-related manner. In other words, the person is greeted, for example, or the person receives a route description to the selected destination.

The aforementioned advantages result here.

In some embodiments, the voice-analysis and control device can generate a context signal, wherein the context signal is able to describe the ascertained voice message content. The generated context signal can then be transmitted to a deep learning engine.

A deep learning engine is a device, a device component, or a program that can apply so-called deep learning (in-depth learning, machine learning) to a large number of data. In other words, the deep learning engine is a sophisticated device for carrying out in-depth learning; i.e., an implementation of artificial intelligence. In other words, artificial intelligence as well as machine learning and in-depth learning can be implemented using the deep learning engine. The deep learning engine can, for example, be designed or configured as an in-depth, artificial neural network, in other words, can be designed to use a machine learning method to generate a large number of empirical values, (i.e., training data or a dataset) according to a predetermined algorithm, for example using a logic contained therein, for example using a correlation.

In one example, the training data or empirical values can be summarized as an artificial neural network come from a database and can be assigned to specified response texts. Such data relating to the voice messages and/or thematic contexts can preferably be used in a number of greater than 1000, in particular greater than 10000, for training the deep learning engine. Such a data set can also be referred to as a big data set.

This also allows further logical links to be created in the deep learning engine. Experience values or training data can, for example, be statistically summarized into a plurality of voice message contents and/or thematic contexts and assigned to different context-related response texts. New voice message content and/or thematic contexts can be prepared by the deep learning engine by building new logical links, and response texts can be generated which are highly likely to be context-related responses to the new voice message.

The voice-analysis and control device is used to operate the deep learning engine, wherein the deep learning engine is either a component of the voice-analysis and control device, or is structurally separate from the voice-analysis and control device and can be controlled remotely from the voice-analysis and control device. The deep learning engine can be used to statistically summarize context-related response texts for a plurality of voice message contents and/or thematic contexts. Using the deep learning engine, the processing of the voice message content described takes place by the generated context signal. In this way, the ascertainment of the context-related response text takes place, which, with a predetermined probability, a context-specific response to the voice input in a user-specific and/or situation-specific manner, and can be suitable for a context-specific dialogue with the person.

The provision of the voice output signal takes place by means of the voice-analysis and control device, by generating the voice output signal which describes the ascertained context-related response text.

In some embodiments, the dialogue between the motor vehicle and the person—i.e., the communication with the motor vehicle—can be even more context-related; i.e., even more user-specific and/or situation-specific. The advantages mentioned above are thereby synergistically enhanced.

In some embodiments, a particularly user-specific communication can be made possible, where the voice-analysis and control device carries out a determination of an identity of the person, preferably using the captured voice message. For this purpose, for example, a person's voice can be captured and detected and/or a voice pattern and/or behavioral data of the person can be ascertained. The thematic context of the captured voice message can then be ascertained using the determined identity.

In some embodiments, the user specificity can be increased by taking into consideration a person's authorization to use the motor vehicle; i.e., for example, to communicate with the motor vehicle. This aspect is particularly interesting if, for example, the motor vehicle's owner only wants his vehicle to communicate with him or other people under specific conditions, or if only people of a specific authorization group are allowed to use the function of the voice-analysis and control device. Such a user group can be, for example, a group of people in which those members have a user account with the manufacturer of the motor vehicle, optionally with all members of the group of people being customers of a motor vehicle manufacturer.

The determined identity of the person is used according to this development by the voice-analysis and control device to check whether the determined identity fulfills a specified usage condition. The specified usage condition can prescribe that the person is authorized to use the motor vehicle. Such an authorization can be stored, for example, in the voice-analysis and control device or, for example, stored in a user profile of the person, wherein the voice-analysis and control device is able to call up the user profile, for example, from a motor vehicle-external data server. According to some embodiments of the present disclosure, the provision of the voice output signal and/or the transmission of the voice output signal provided is only carried out if the specified usage condition is fulfilled.

In some embodiments, the voice-analysis and control device uses the determined identity of the person to check a user profile of the person stored on a storage device in order to verify whether the authorization is present.

For a particularly individual communication with the person, according to some embodiments of the present disclosure, the voice-analysis and control device can carry out the determination of a relative position of the person to the motor vehicle. Depending on the determined relative position of the person, a determination of a loudspeaker can take place which fulfills a specified alignment criterion. The specified alignment criterion can specify an alignment of the loudspeaker towards the person. In other words, the alignment criterion can specify that the loudspeaker is arranged on the motor vehicle in such a way that the sound output of the loudspeaker takes place in the direction of the determined relative position of the person. The generated voice output signal can specify the loudspeaker that has been determined to output the provided voice output signal.

In this example, the motor vehicle can communicate with a plurality of people at the same time, for example via a loudspeaker at the front left of the motor vehicle with a person at the front left of the motor vehicle and via a loudspeaker arranged under the trunk with a person standing at the trunk of the motor vehicle.

In some embodiments, the voice-analysis and control device selects the loudspeaker from a plurality of loudspeakers of the sound output device.

The determination of the relative position of the person can take place, for example, by comparing the geographic coordinates of the motor vehicle and the person, wherein the geographic coordinates of the person can be received, for example, from a mobile terminal device of the person. Alternatively or additionally, the determination of the relative position can be carried out by suitable motor vehicle sensors, for example with the aid of proximity sensors which can be arranged on the outside of the motor vehicle.

For assisting the person on the way to a destination, according to some embodiments of the present disclosure, the voice-analysis and control device can ascertain a place of destination of the person using the ascertained voice message content. For example, by voice analysis, the spoken text of the person—i.e., the voice message—can be examined for a city name, a proper name of a place or a name for a place, for example the name "restaurant." For example, with the aid of navigation software and/or an Internet search, all restaurants in the surroundings can then be ascertained, and one of the restaurants can be determined as the place of destination.

A route is ascertained from a current location of the person and/or from a current location of the motor vehicle to the ascertained place of destination. The task of ascertaining the route can be transmitted to a navigation device, for example, or can be carried out by the voice-analysis and control device using, for example, navigation software. In some embodiments, the context-related response text can include a route description from the current location of the person and/or from the current location of the motor vehicle to the ascertained place of destination along the ascertained route.

Extended communication between the motor vehicle and the person is made possible if, in addition to the output of the acoustically perceivable response text, the motor vehicle provides visual feedback. According to a further embodiment, the voice-analysis and control device specifies a lighting system device of the motor vehicle, wherein the lighting system device is understood to mean a device or a group of devices for outputting light and/or for displaying display content. The lighting system device can have, for example, one (or more) headlights, and/or turn signals, and/or at least one screen. According to this embodiment, the voice-analysis and control device is used for transmitting a lighting system control signal which describes a light pattern to the specified lighting system device to output the light pattern. The light pattern can, for example, be a multiple flashing of the headlights or a display content to be displayed on the exemplary screen.

The light pattern signal is provided by the voice-analysis and control device, preferably as a function of the ascertained voice message content and/or depending on the ascertained thematic context; and/or depending on a line of sight of the person captured by a sensor device of the motor vehicle. As a result, the communication between the motor vehicle and the person is expanded and supported by an optical effect. If the light pattern signal depends on the captured line of sight of the person, then the person can, for example, recognize which motor vehicle is currently communicating with him, for example if a plurality of motor vehicles are nearby.

In surroundings with a disturbing background noise, or if, for example, the person is not very close to the motor vehicle, a motor vehicle-internal voice detection device may not be able to record the voice message very well or even incompletely, depending on the circumstances. In order to allow a particularly high quality of the context-related response even in such situations, the voice-analysis and control device can receive the voice signal from a voice detection device of the motor vehicle according to some embodiments of the present disclosure, and can also receive an additional voice signal which describes the voice message captured by a motor vehicle-external voice detection device from an additional, motor vehicle-external voice detection device. The motor vehicle-external voice detection device can preferably be a voice detection device of a mobile terminal device, for example a voice detection device from a smartwatch of the person or a smartphone of the person. Alternatively, the motor vehicle-external voice detection device can be arranged on or in the person and can be configured, for example, as an implanted chip.

Subsequently, the voice-analysis and control device is used for ascertaining which of the voice messages is of better quality than the other voice messages, wherein the ascertainment of the voice message content and the thematic context takes place on the basis of the voice message which has the better quality, and wherein the provision of the voice output signal based on the voice message takes place with the better quality and the corresponding thematic context.

The stated object is achieved by a voice-analysis and control device which is designed to carry out the method steps relating to a voice-analysis and control device according to some embodiments of the present disclosure. The voice-analysis and control device can be designed, for example, as a control board, or control chip, or software. The voice-analysis and control device can preferably have a processor device which is designed to cause the voice-analysis and control device to carry out the relevant method steps. A processor device is understood to mean a device, or a device component, or a component group for electronic data processing, which can preferably have at least one microcontroller and/or at least one microprocessor. Optionally, a storage device can be provided—i.e., a component or a component for storing data—wherein the storage device can be designed, for example, as a memory card or as a hard disk or as a memory chip. A program code can be stored on the storage device which, when executed by the processor device, causes the voice-analysis and control device to carry out the method according to the disclosure.

The stated object is achieved by a motor vehicle which has a sound output device, the sound output device being designed to output a voice output signal—i.e., an audio signal—to the exterior surroundings of the motor vehicle. The motor vehicle, which can preferably be designed as a motor vehicle, for example as a passenger car, has an embodiment of the voice-analysis and control device according to the disclosure.

The stated object is also solved if the voice-analysis and control device is a component of a motor vehicle-external server device. A server device is understood to mean, for example, a data server, a computer, a computer network or, for example, a data cloud. The server device, which is motor vehicle-external, has the voice-analysis and control device according to some embodiments of the disclosure. The motor vehicle-external server device can preferably be designed for operating on the Internet.

The disclosure also includes the combinations of the features of the described embodiments.

The embodiments explained in the following are preferred embodiments of the disclosure. In the embodiments, the components of the embodiments that are described each constitute individual features of the disclosure to be considered independently of one another, which individually also further develop the disclosure independently of one another and are thus also to be considered part of the disclosure both individually and in a combination that is different from the combination described. In addition, the embodiments described may also be supplemented by further features of the disclosure which have already been described.

In the figures, the same reference signs refer to functionally identical elements.

Figure 1:
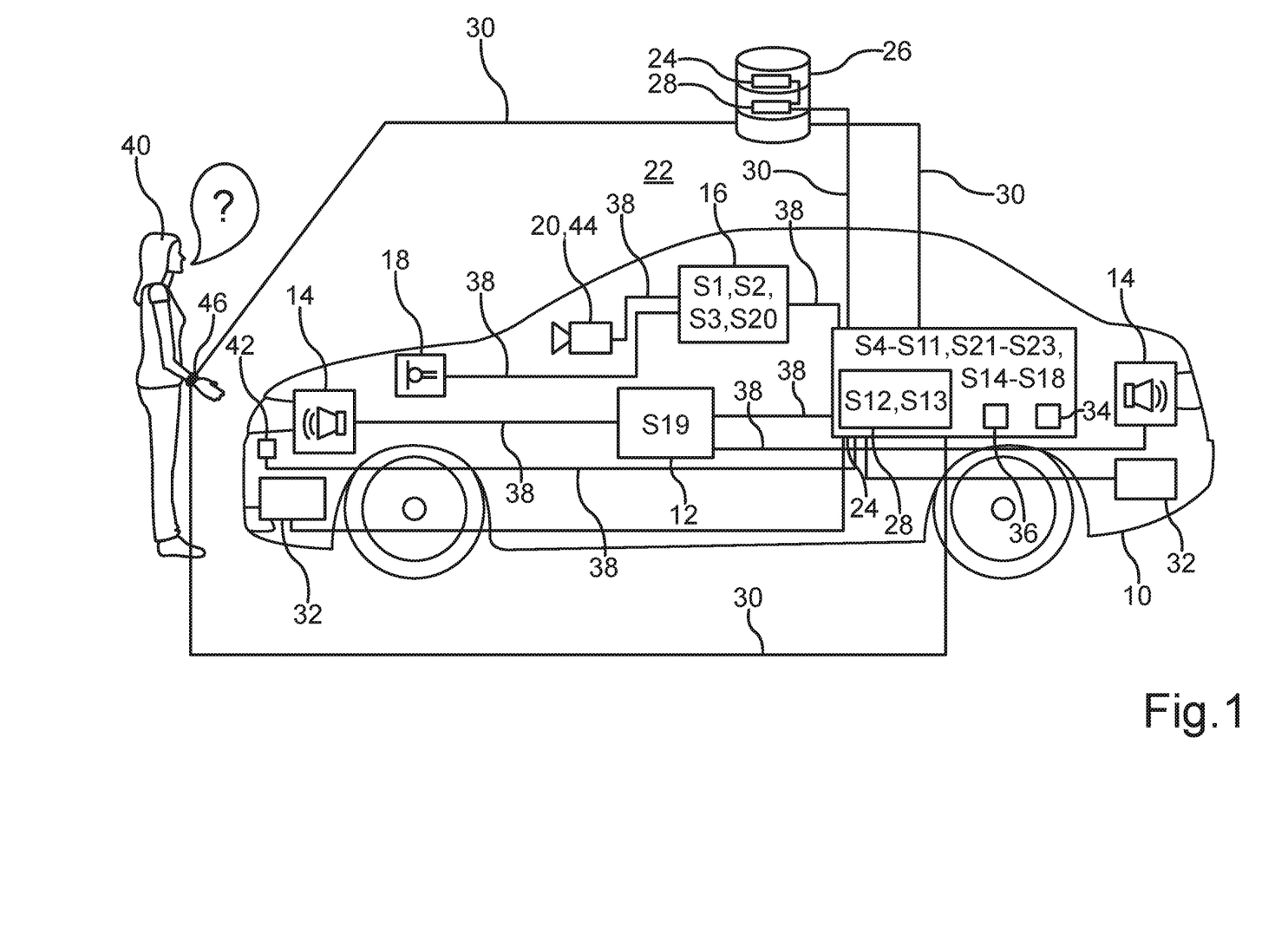
FIG. 1 is a schematic representation of an embodiment of the method and the device, according to the present disclosure.

The figure illustrates the principle of the method according to some embodiments of the present disclosure. FIG. 1 shows a motor vehicle 10, for example a passenger car, which can preferably be operated in a piloted driving mode. The motor vehicle 10 has a sound output device 12 which is designed to output an audio signal. The sound output device 12 can be configured, for example, as an infotainment system or loudspeaker system having one or more loudspeakers 14.

One of the exemplary loudspeakers 14 can be arranged on a rear side of the outside of the motor vehicle 10, and an additional loudspeaker 14 of the sound output device 12 can be arranged on a front side of the motor vehicle 10, for example on an outside of the motor vehicle 10 under the left headlight. An additional, optional loudspeaker 14 (not shown in FIG. 1) can be arranged, for example, below the right headlight.

A voice detection device 16 of the motor vehicle can have, for example, a microphone 18 and/or a camera 20. The voice detection device 16 can preferably have a plurality of microphones 18 and/or a plurality of cameras 20, which, for example, are each arranged on the outside of the motor vehicle 10 and can be oriented in different directions. In the example of FIG. 1, for reasons of clarity, only one microphone 18 and one camera 20 are shown, each of which can be oriented forwards. For example, the camera can be arranged on a headlining of the motor vehicle 10 and film the exterior surroundings 22 of the motor vehicle 10 through a windshield. The microphone 18 shown in FIG. 1 can, for example, be designed as a directional microphone and also be arranged on the outside of the motor vehicle 10, for example next to or on one of the loudspeakers 14, or for example in the middle of a radiator of the motor vehicle 10.

The voice detection device 16 can, for example, have software for evaluating the camera image, which can detect lip movements using a suitable algorithm, for example via a labial movement detection, and can describe these in a voice signal.

FIG. 1 shows a voice-analysis and control device 24 of the motor vehicle, which can alternatively be a component of a motor vehicle-external server device 26. The motor vehicle-external server device 26 can be, for example, a data cloud or, for example, a data server or data server network. Alternatively, the voice-analysis and control device 24 can comprise components of the server device 26 and the motor vehicle 10.

The voice-analysis and control device 24 can be configured, for example, as a control board or control unit. FIG. 1 shows a variant in which the voice-analysis and control device 24 can have a deep learning engine 28. Alternatively, the deep learning engine 28 can be a component of the server device 26, which can be remotely controlled by the voice-analysis and control device 24 of the motor vehicle 10. Such remote control can take place via a data communication connection 30, for example via a mobile radio connection or an Internet connection. Alternatively, the voice-analysis and control device 24 can be located in the server device 26 and have the deep learning engine.

The deep learning engine 28 can preferably be designed as an artificial, neural network, which has been trained on the basis of empirical values or training data, which can include, for example, voice patterns and/or specified voice contents, to ascertain and/or to generate a context-related response text depending on a voice message content. In such a learning process, for example, a multitude of voice message contents can be evaluated by means of a cluster analysis and thus entry points and exit points of the neural network can be formed. A deep learning engine 28 which has been trained in this way can then be used to evaluate new voice message content in relation to the situation and to provide a context-related response text in each case. The response text can be generated as a starting point or starting value, for example, which is, for example, a situation-related and/or user-specific response with a specified minimum probability, in order to conduct a context-related dialogue with the person.

As an exemplary lighting system device 32 of the motor vehicle 10, FIG. 1 shows, by way of example, a system of, for example, headlights on a motor vehicle front and, for example, one or more screens on a motor vehicle rear. The exemplary voice-analysis and control device 24 can optionally have a processor device 34, which can have, for example, a plurality of microprocessors. Additionally or alternatively, the voice-analysis and control device 24 can have a storage device 36, which can be designed, for example, as a control chip. For reasons of clarity, these two optional components are not shown in FIG. 1 in the optional voice-analysis and control device 24 of the motor vehicle-external server device 26, but the voice-analysis and control device 24 of the server device 26 can be configured and designed analogously to that of the motor vehicle 10. In the following, the method steps are explained by way of example for the voice-analysis and control device 24 of the motor vehicle 10, the same method steps being able to be carried out analogously in the alternative of the arrangement of the voice-analysis and control device 24 in the server device 26.

The individual components of motor vehicle 10 can be interconnected by wired and/or wireless data communication connections 38. As wired data communication connections 38, these can be configured, for example, as a data bus of the motor vehicle 10, for example as a CAN bus. Exemplary wireless data communication connections 38 are, for example, a WLAN connection or a Bluetooth LE connection.

In the example in FIG. 1, the motor vehicle 10 can be a driving or parked, piloted motor vehicle 10. A person 40, for example a pedestrian, can approach the motor vehicle 10 from the front left. The person 40 can, for example, stand at a distance of two meters from the motor vehicle 10 and ask the question: "Where is the nearest restaurant?," or simply greet the motor vehicle 10: "Good Morning."

This voice message, for example the question about the restaurant in the example in FIG. 1, can be captured in the optional method step S by the voice detection device 16. For this purpose, for example, the optional microphone 18 on the front of the motor vehicle can record the voice message. Alternatively or additionally, the exemplary camera 20 can film the face of the person 40 and thereby record the lip movement when the question is asked. The voice detection device 16 can provide the voice-analysis and control device 24 with a corresponding voice signal from the camera 20 and/or the microphone 18 (S2), in which the exemplary signal from the microphone 18 can be transmitted to the voice-analysis and control device 24 (S3), or in that lip movement detection (labial movement detection) can be carried out, for example, on the basis of the exemplary signal from camera 20. The captured lip movement is used to derive the text of the voice message. Methods and algorithms known to the prior art are available for this purpose. In the optional method step S2, the voice detection device 16 can generate the voice signal and transmit it to the voice-analysis and control device 24 (S3). The voice signal from the voice detection device 16 is then received by the voice-analysis and control device 24 (S4).

Alternatively, the voice message can also be received (S4) from a mobile terminal device of the person 40, wherein the voice detection device 16 can be designed to communicate with the mobile terminal device.

In some embodiments, the voice-analysis and control device 24 only communicates with the person 40 if the person is authorized. A usage condition specified in the storage device 36 can, for example, stipulate that communication with the person 40 only takes place if the person is a member of a so-called "community" or "online community;" i.e., an organized group of members who communicate with each other on the Internet and partially interact in a virtual space or otherwise form a social network. An exemplary social network may be a network of customers of a particular motor vehicle manufacturer. In order to be a member of such a network, the person 40 has a user profile that can be stored on the motor vehicle-external server device 26, and that the person 40 and/or, for example, a vehicle owner of the motor vehicle 10 has/have consented to communication between motor vehicle 10 and the person 40 using such a user profile.

A current location of the person 40 can be stored in an exemplary user profile, for example. To use the communication service of the motor vehicle 10, for example the person 40 should first register in the user profile. Alternatively or additionally, a holder of the motor vehicle 10 can, for example, give authorizations via their user profile, in which authorizations can be precisely determined which persons may use the communication service of the motor vehicle 10. Optionally, a holder of motor vehicle 10 can also release which information—i.e., which communication content—can be used as context-related response text. If the exemplary owner of the motor vehicle 10 declares, for example, that context-related advertising can also be output via his motor vehicle 10, he can receive a sum of money as a reward, from a motor vehicle manufacturer that provides a platform for the community.

The determination of the identity of the person 40 (S5) can take place, for example, by ascertaining behavioral data, wherein, for example, a posture and/or a parameter of a voice of the person 40 and/or a voice pattern of the voice message is analyzed. For this purpose, data from the exemplary camera 20 and/or the exemplary microphone 18 can be used. Alternatively or additionally, data can be called up and/or received from a mobile terminal device of the person 40, for example via a mobile radio connection or an Internet connection, which data can provide information about the identity of the person 40. Such a connection between a mobile terminal device, for example a smartphone or laptop, and the motor vehicle 10 can be established via a WLAN or near-field communication connection. Alternatively, facial recognition can take place using the camera image. For facial recognition and determining the identity (S5), for example, a reference photo of the person 40 can be stored in the storage device 36 in order to compare it with a current camera image.

An additional, optional identification means can be an implanted chip, for example. The identification of the person 40 (S5) can preferably be a two-factor identification; i.e., the identity can be determined in two successive identification steps.

For checking the authorization of the person 40 (S6), the user profile of the person 40 can be called up, for example, on the basis of the determined identity and checked for the user authorization, or corresponding information can be stored in the storage device 36. Such an authorization can be present in the example in FIG. 1.

In some embodiments, the relative position of the person 40 is determined, for example by location information of the mobile terminal device of the person 40 or by a sensor of the motor vehicle 10 (S7) in the example in FIG. 1 on the left front headlight. For this purpose, the motor vehicle 10 can have a plurality of sensors 42, for example proximity sensors, on the outside and at a plurality of locations around the motor vehicle 10. Alternatively or additionally, the relative position can be ascertained, for example, via the camera signal, or using the voice signal received from the exemplary microphone 18, in which the voice detection device 16 or the voice-analysis and control device 24 ascertains from which of the exemplary directional microphones 18 the voice message is captured or has been captured. If the sound output device 12 has a plurality of loudspeakers 14, for example a loudspeaker 14 on the left front corner of the motor vehicle 10 can be specified for the output of the voice output signal.

The received voice signal is used by the voice-analysis and control device 24 to ascertain a voice message content (S8), for example by means of a text analysis. Suitable techniques and algorithms are known to the person skilled in the art from the prior art. In addition, an ascertainment of the thematic context (S9) takes place, in the example in FIG. 1, the context of a query for a restaurant search with navigation. The thematic context S9 can preferably be ascertained depending on the ascertained voice message content. Optionally, when ascertaining the context S9, for example a voice analysis, a mood of the person 40 can be detected, on which a formulation of the response text provided later may depend.

If an additional voice signal is optionally received from a mobile terminal device 46, for example from a smart watch of the person 40, methods known to the person skilled in the art from prior art can be used to ascertain which of the voice messages has a better quality than the other of the voice messages.

If the voice-analysis and control device 24 operates the deep learning engine 28, the ascertained voice message content can be transmitted to the deep learning engine 28 by means of a context signal generated (S10) by the voice-analysis and control device 24. When operating the deep learning engine 28 (S11), the voice message content can be processed by the engine (S12) and the context-related response text can thereby be ascertained (S13).

In the example of the question about the restaurant, for example, the term "restaurant" can be ascertained as the place of destination (S14), and in cooperation with a navigation device (not shown in FIG. 1), a route can be taken from the location of the person 40 and the motor vehicle 10 to a so-called "point of interest;" i.e., a geopoint of particular interest, in the "restaurant" category (S15). The last-mentioned steps can preferably be carried out by the voice-analysis and control device 24. The voice-analysis and control device 24 and/or the deep learning engine 28 can ascertain the route description as context-related response text (S16) and thereby formulate it.

In a particularly user-specific variant, the determined identity of the person 40 can also be taken into consideration. If the person 40 is, for example, a person who has been stored as a known person or as a vehicle owner, the response text can be formulated particularly personally, for example with a personal salutation, a salutation in the form of politeness, or it can be a special one, for example the preferred restaurant of the person 40 with the determined identity can be selected as the place of destination.

To output the ascertained response text, a voice output signal is provided (S17), which describes the context-related response text and is an audio signal. The provided voice output signal can then be transmitted (S18) to the sound output device 12.

If the communication between the motor vehicle 10 and the person 40 depends on the authorization of the person 40, it can be decided, depending on the checking step described above, whether the determined identity fulfills the specified usage condition (S6), whether the voice output signal is provided (S7), and/or whether the provided voice output signal is transmitted (S18).

In the example of FIG. 1, the voice output signal (S19) can be output, for example, only via the loudspeaker 14 at the front left where the person 40 is standing. Via the additional loudspeaker 14, for example, which can be located, for example, on the rear right on the outside of the motor vehicle 10, the motor vehicle 10 can then conduct another dialogue with another person 40, for example with a different thematic context. If the optional line-of-sight detection is provided, which can be carried out, for example, by a sensor device 44 of the motor vehicle. Sensor device 44 is understood to be a device or a device component for detecting the surroundings of motor vehicle 10. The exemplary optional sensor device 44 can, for example, have the camera 20 as a sensor and thereby film an eye position of the person 40 and thus detect a line of sight of the person 40 (S20). The sensor device 44 can include, for example, the voice detection device 16. If it is captured (S20) that the user is not looking at the motor vehicle 10, a light pattern signal can be provided (S21), which can describe, for example, a flashing of all turn signals or a flickering of the headlights. The person 40 can thus be made aware that this motor vehicle 10 is currently communicating with him. If there are other motor vehicles in the vicinity of the person 40, the person 40 can quickly recognize which motor vehicle 10 is communicating with them.

Alternatively or additionally, the light pattern signal can be provided depending on the ascertained voice message content and/or on the ascertained thematic context (S21), wherein, for example, when the greeting is provided as a context-related response text, the turn signal system can flash reciprocally. A situation-specific and/or user-specific specification can be used to specify the specification of the lighting system device (S22), for example, which specification can be stored in the storage device 36. The light pattern signal provided can be transmitted to the lighting system device 32, so that the light pattern and the voice output take place synchronously.

In a situation other than the one described above, the context-related response text can be, for example, a response to a question about a shopping location nearby. The response text can be, for example, "I was just looking for a laptop on the Internet and there is a shop nearby that sells a suitable laptop for you." and/or for example: "There is a specially good offer in the shop near you." The person 40 can thus use third-party motor vehicles 10 as a source of information, and the motor vehicle 10 can thus also be used as an advertising measure.

For example, if the person 40 is not a pedestrian but a driver of another motor vehicle (not shown in FIG. 1) and the person 40 has inquired whether there is anything special to be seen in this city, the response text can, for example be: "Continue straight, you might be interested in the shops on the market square."

If the person 40 is a parcel carrier, for example, the motor vehicle 10 can be used, as a pick-up station, and in response to, for example, a corresponding request to open the tailgate of the parcel carrier. The motor vehicle 10 can, for example, respond: "The tailgate is now open for 10 seconds." In this case, the identification of the person 40 already described above can preferably be provided as a condition for opening the tailgate.

For example, if a plurality of people 40 approaches the motor vehicle 10, for example the entire family of the owner of the motor vehicle 10, the motor vehicle 10 can address the owner of the motor vehicle 10 in a context-related manner, for example: "Hello Peter, watch out, I'm opening the door for you now." Optionally, feedback can be provided after a short time, for example with the response text: "Warning, the motor vehicle is now closed."

In the case of person-specific communication, for example, an unknown person 40 can be greeted by the motor vehicle 10 with: "Good afternoon." While, for example, the person 40 identified as the vehicle owner can be greeted with the words: "Good morning dear Julia, I wish you a nice day."

Figure 2:
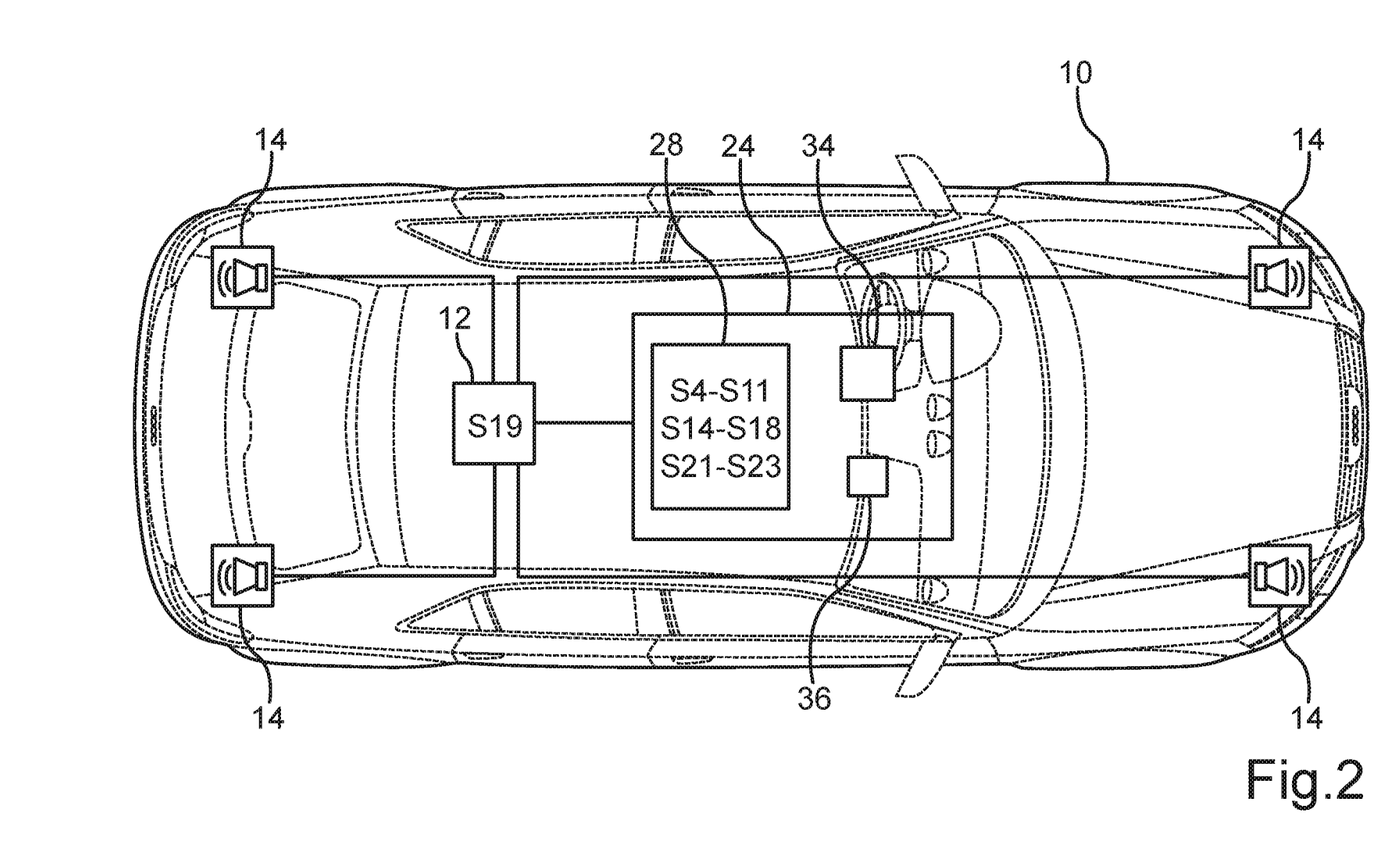
FIG. 2 is a schematic representation of a further embodiment of the motor vehicle according to the present disclosure.

FIG. 2 shows an embodiment of motor vehicle 10, which may correspond to motor vehicle 10 of FIG. 1. The focus of the representation in FIG. 2 is on the illustration of possible arrangements of the loudspeakers 14, which is why, for reasons of better clarity, not all components of the motor vehicle 10 are shown, as has already been described for FIG. 1. The motor vehicle 10 in FIG. 2 can, however, correspond to the motor vehicle 10 in FIG. 1.

FIG. 2 illustrates a particularly advantageous arrangement of, for example, four loudspeakers 14 on both sides of the motor vehicle front and on both sides of the motor vehicle rear.

Overall, the examples show how the present disclosure makes possible the vehicle communication with people via external sound loudspeakers 14. The motor vehicle 10 can use the voice-analysis and control device 24, which can be configured, for example, as an on-board computer, or can have artificial intelligence and can actively communicate with the person 40 via the loudspeakers 14 using voice.

Optionally, a better warning for pedestrians or cyclists, for example, can be provided by the additional support of the lighting system device 32, which can preferably have a display area, wherein the display area is preferably arranged on the motor vehicle 10 and can be designed, for example, as a display at the front end and/or can have a headlight. Such a better warning can be given by voice, for example the motor vehicle 10 can communicate the warning "Caution" or for example "I am stopping for you—you can cross the road."

In some embodiments, intensified communication can take place between the vehicle owner, optionally with his family environment, and the motor vehicle 10, wherein the communication possibility and an optional confirmation on the part of the motor vehicle 10 can take place even before entering the motor vehicle 10. According to a further embodiment, the business fields described above can be generated.

FIG. 2 shows an example of a representation of exemplary external sound loudspeakers 14, it being possible for at least one loudspeaker 14, particularly preferably at least two loudspeakers 14, to be arranged at the front and rear.

In some embodiments, the communication of the motor vehicle 10 can be technically implemented as follows. The reception of signals for the motor vehicle 10—i.e., the reception of the voice signal (S4)—can take place, for example, according to the following two variants. In a first variant, the person 40 can communicate with the motor vehicle 10, for example, by a smartphone, a smartwatch, a car key with a built-in microphone or an implanted chip. These signals can, for example, be transmitted "over the air," i.e., wirelessly, to the motor vehicle 10. In a second variant, the motor vehicle 10 can have one or more sensors, for example, and can recognize the voice.

The motor vehicle 10 can communicate, for example, via installed loudspeakers 14 after signal processing. The signal processing can take place, for example, as already described above.

In some embodiments, a so-called "community" of the motor vehicle manufacturer can be included, and an advertisement can optionally be output as a context-related response text. In an optional first step, for example, any person 40 can register in a user group, for example via a user program ("app") of the motor vehicle manufacturer's social network. The user group can comprise a system of motor vehicles 10, for example all motor vehicles 10 of the motor vehicle manufacturer. In a further step, each user can optionally input interests and/or personal data into the system, optionally also share their respective location. The location can be shared, for example, via a smartphone, a smartwatch, a car key, or an implanted chip. In a third step, a vehicle owner of the motor vehicle 10 can authorize that his motor vehicle 10 may communicate with other people 40 of the user group of the motor vehicle manufacturer or the user program of the user group of the motor vehicle manufacturer. In an optional fourth step, every parked and/or moving motor vehicle of the motor vehicle manufacturer can recognize a person in the user group and can then address them personally, for example ("Hello, Mr. Mustermann—How are you?—How can I help you?—Do you already know product A?—Are you looking for a restaurant nearby?").

In some embodiments, motor vehicle 10 can address a pedestrian, for example, who may be a member of the user group, and actively respond to questions or address current advertising deals.

The invention claimed is:

1. A method for operating a sound output device of a motor vehicle by a voice-analysis and control device, comprising:
    receiving a voice signal from a voice detection device, wherein the received voice signal describes a voice message of a person, wherein the person is in exterior surroundings of the motor vehicle, and wherein the voice message of the person is captured by the voice detection device;
    ascertaining a voice message content of the captured voice message and a thematic context of the captured voice message using the received voice signal;
    processing, by a deep learning engine, the ascertained voice message content and thereby ascertaining a context-related response text with a predetermined probability for a context-specific response to the voice signal in a user-specific and/or situation-specific manner for a context-specific dialogue with the person;
    providing a voice output signal depending on the ascertained thematic context and the ascertained voice message content, wherein the voice output signal describes the context-related response text for the captured voice message;
    transmitting the provided voice output signal to the sound output device to output the provided voice output signal to the exterior surroundings of the motor vehicle;
    specifying a lighting system device of the motor vehicle; and
    transmitting a light pattern signal, which describes a light pattern, to the specified lighting system device to output the light pattern, wherein the light pattern signal is provided depending on the ascertained voice message content and/or depending on the ascertained thematic context.

2. The method according to claim 1, further comprising:
    generating a context signal that describes the ascertained voice message content;
    transmitting the generated context signal to the deep learning engine;

operating the deep learning engine, wherein the deep learning engine statistically summarizes context-related response texts for a plurality of voice message contents; and
providing the voice output signal by generating the voice output signal which describes the ascertained context-related response text.

3. The method according to claim 1, further comprising:
determining an identity of the person using the captured voice message, wherein the determined identity is used to ascertain the thematic context of the captured voice message.

4. The method according to claim 3, further comprising:
using the determined identity of the person to check whether the determined identity fulfills a specified usage condition,
wherein the specified usage condition prescribes that the person is authorized to use the motor vehicle; and
wherein the provision of the voice output signal and/or the transmission of the provided voice output signal only takes place if the specified usage condition is fulfilled.

5. The method according to claim 1, further comprising:
determining a relative position of the person to the motor vehicle; and
depending on the determined relative position of the person, determining a loudspeaker which fulfills a specified alignment criterion, wherein the specified alignment criterion specifies an alignment of the loudspeaker towards the person, wherein the generated voice output signal specifies the determined loudspeaker to output the voice output signal.

6. The method according to claim 1, wherein the provision of the voice output signal comprises:
using the ascertained voice message content to ascertain a place of destination of the person; and
ascertaining a route from a current location of the person and/or from a current location of the motor vehicle to the ascertained place of destination, wherein the context-related response text includes a route description from the current location to the ascertained place of destination along the ascertained route.

7. The method according to claim 1, wherein the light pattern signal is further provided as depending on a line of sight of the person captured by a sensor device of the motor vehicle.

8. The method according to claim 1, further comprising:
receiving a further voice signal from an additional motor vehicle-external voice detection device, from a voice detection device of a mobile terminal device, or from a voice detection device which is arranged on or in the person; and
ascertaining the voice message that has better quality,
wherein the ascertainment of the voice message content and the thematic context takes place on the basis of the voice message that has better quality; and
wherein the provision of the voice output signal is based on the voice message that has better quality and the corresponding thematic context.

9. A voice-analysis and control device for operating a sound output device of a motor vehicle, configured to:
receive a voice signal from a voice detection device, wherein the received voice signal describes a voice message of a person, wherein the person is in exterior surroundings of the motor vehicle, and wherein the voice message of the person is captured by the voice detection device;
ascertain a voice message content of the captured voice message and a thematic context of the captured voice message using the received voice signal;
provide a voice output signal depending on the ascertained thematic context and the ascertained voice message content, wherein:
the voice output signal describes a context-related response text for the captured voice message; and
the context-related response text is ascertained, by a deep learning engine, with a predetermined probability based on the ascertained voice message content for a context-specific response to the voice signal in a user-specific and/or situation-specific manner for a context-specific dialogue with the person;
transmit the provided voice output signal to the sound output device to output the provided voice output signal to the exterior surroundings of the motor vehicle;
specify a lighting system device of the motor vehicle; and
transmit a light pattern signal, which describes a light pattern, to the specified lighting system device to output the light pattern, wherein the light pattern signal is provided depending on the ascertained voice message content and/or depending on the ascertained thematic context.

10. A motor vehicle, comprising:
a sound output device configured to output a voice output signal to the exterior surroundings of the motor vehicle;
a voice detection device configured to capture a voice message of a person in exterior surroundings of the motor vehicle;
a lighting system device; and
a voice-analysis and control device configured to:
receive a voice signal from the voice detection device, wherein the received voice signal describes the voice message of the person;
ascertain a voice message content of the captured voice message and a thematic context of the captured voice message using the received voice signal;
provide a voice output signal depending on the ascertained thematic context and the ascertained voice message content, wherein:
the voice output signal describes a context-related response text for the captured voice message; and
the context-related response text is ascertained, by a deep learning engine, with a predetermined probability based on the ascertained voice message content for a context-specific response to the voice signal in a user-specific and/or situation-specific manner for a context-specific dialogue with the person;
transmit the provided voice output signal to the sound output device to output the provided voice output signal to the exterior surroundings of the motor vehicle;
specify the lighting system device; and
transmit a light pattern signal which describes a light pattern to the specified lighting system device to output the light pattern, wherein the light pattern signal is provided depending on the ascertained voice message content and/or depending on the ascertained thematic context.

11. A motor vehicle-external server device, comprising:
a voice-analysis and control device, configured to:
receive a voice signal from a voice detection device, wherein the received voice signal describes a voice message of a person, wherein the person is in exterior surroundings of the motor vehicle, and wherein the voice message of the person is captured by the voice detection device;

ascertain a voice message content of the captured voice message and a thematic context of the captured voice message using the received voice signal;

provide a voice output signal depending on the ascertained thematic context and the ascertained voice message content, wherein:
  the voice output signal describes a context-related response text for the captured voice message; and
  the context-related response text is ascertained, by a deep learning engine, with a predetermined probability based on the ascertained voice message content for a context-specific response to the voice signal in a user-specific and/or situation-specific manner for a context-specific dialogue with the person;

transmit the provided voice output signal to a sound output device to output the provided voice output signal to the exterior surroundings of the motor vehicle;

specify a lighting system device of the motor vehicle; and transmit a light pattern signal, which describes a light pattern, to the specified lighting system device to output the light pattern, wherein the light pattern signal is provided depending on the ascertained voice message content and/or depending on the ascertained thematic context.

* * * * *